(12) United States Patent
    Cherif et al.

(10) Patent No.:     US 12,597,866 B2
(45) Date of Patent:          Apr. 7, 2026

(54) DYNAMIC CURRENT RECTIFIER

(71) Applicant: NORTHROP GRUMMAN SYSTEMS CORPORATION, Falls Church, VA (US)

(72) Inventors: Bouchaib Cherif, Yorktown Heights, NY (US); Philippe Olivier-Marie Pouliquen, Baltimore, MD (US)

(73) Assignee: NORTHROP GRUMMAN SYSTEMS CORPORATION, Falls Church, VA (US)

( * ) Notice:     Subject to any disclaimer, the term of this patent is extended or adjusted under 35 U.S.C. 154(b) by 202 days.

(21) Appl. No.: 18/384,547

(22) Filed:     Oct. 27, 2023

(65)                Prior Publication Data

US 2025/0141364 A1     May 1, 2025

(51) Int. Cl.
     H02M 7/04       (2006.01)
     G05F 3/26       (2006.01)
     H02M 1/088      (2006.01)
(52) U.S. Cl.
     CPC .............. H02M 7/05 (2021.05); G05F 3/262 (2013.01); H02M 1/088 (2013.01)
(58) Field of Classification Search
     CPC ........... H02M 7/02; H02M 7/04; H02M 7/05; H02M 7/10; H02M 7/155; H02M 7/162; H02M 7/217; H02M 7/2176; H02M 7/219; H02M 1/08; H02M 1/088; G05F 3/00; G05F 3/02; G05F 3/04; G05F 3/08; G05F 3/16; G05F 3/185; G05F 3/20; G05F 3/205; G05F 3/22; G05F 3/24; G05F 3/26; G05F 3/262; G05F 3/265; G05F 3/267

USPC ......... 363/44–48, 59–61, 123–127; 323/304, 323/311–317; 327/128, 303, 330, 343
     See application file for complete search history.

(56)                References Cited

U.S. PATENT DOCUMENTS 6,788,146 B2      9/2004  Forejt et al.
     6,812,778 B1     11/2004  Yeo et al.
     8,121,495 B2      2/2012  Tourette
     2003/0122617 A1   7/2003  Johnston
                       (Continued)

OTHER PUBLICATIONS

Notification, International Search Report, and Written Opinion mailed Dec. 2, 2024, from International Patent Application No. PCT/US2024/051363, 13 sheets.
                       (Continued)

*Primary Examiner* — Thienvu V Tran
*Assistant Examiner* — Carlos O Rivera-Perez
(74) *Attorney, Agent, or Firm* — KATTEN MUCHIN ROSENMAN LLP

(57)                ABSTRACT

A dynamic current rectifier includes an input terminal for receiving an input current, an output terminal for outputting a rectified output current, a first current mirror, a second current mirror, a first switch having a first terminal coupled to the input terminal and a second terminal coupled to the first current mirror, a second switch having a first terminal coupled to the output terminal and a second terminal coupled to the first current mirror, a third switch having a first terminal coupled to the input terminal and a second terminal coupled to the second current mirror, and a fourth switch having a first terminal coupled to the output terminal and a second terminal coupled to the second current mirror.

19 Claims, 3 Drawing Sheets

(56) References Cited

U.S. PATENT DOCUMENTS

2021/0104952 A1*  4/2021  Kaneko .............. H03F 3/45183

OTHER PUBLICATIONS

Wegmann G et al: "Analysis and Improvements of Accurate Dynamic Current Mirrors", IEEE Journal of Solid-State Circuits, IEEE, USA, vol. 25, No. 3, Jun. 1, 1990 (Jun. 1, 1990), pp. 699-706, XP000140200, ISSN: 0018-9200, DOI: 10.1109/4.102663 pp. 699-700; figure 1.
Walker P D et al: "CMOS Half-Wave and Full-Wave Precision Voltage Rectification Circuits", 38th. Midwest Symposium on Circuits and Systems: Proceedings, Rio De Janeiro, Aug. 13-16, 1995; [Midwest Symposium on Circuits and Systems: Proceedings], New York, IEEE, US, vol. SYMP. 38, Aug. 13, 1995 (Aug. 13, 1995), pp. 901-904, XP000825205, ISBN: 978-0-7803-2973-7 p. 901-p. 903; figures 1-8.
"Current Copier Cells", Electronics Letters, the Institution of Engineering and Technology, GB, vol. 24, No. 25, Dec. 8, 1988 (Dec. 8, 1988), p. 1560-1562, XP000111570, ISSN: 0013-5194 p. 1560-p. 1561; figures 1,2.
Doctoral Thesis of George Wegmann, "Design and Analysis Techniques for Dynamic Current Mirrors," Ecole Polytechnique Federale de Lausanne (1990), 198 sheets.

* cited by examiner

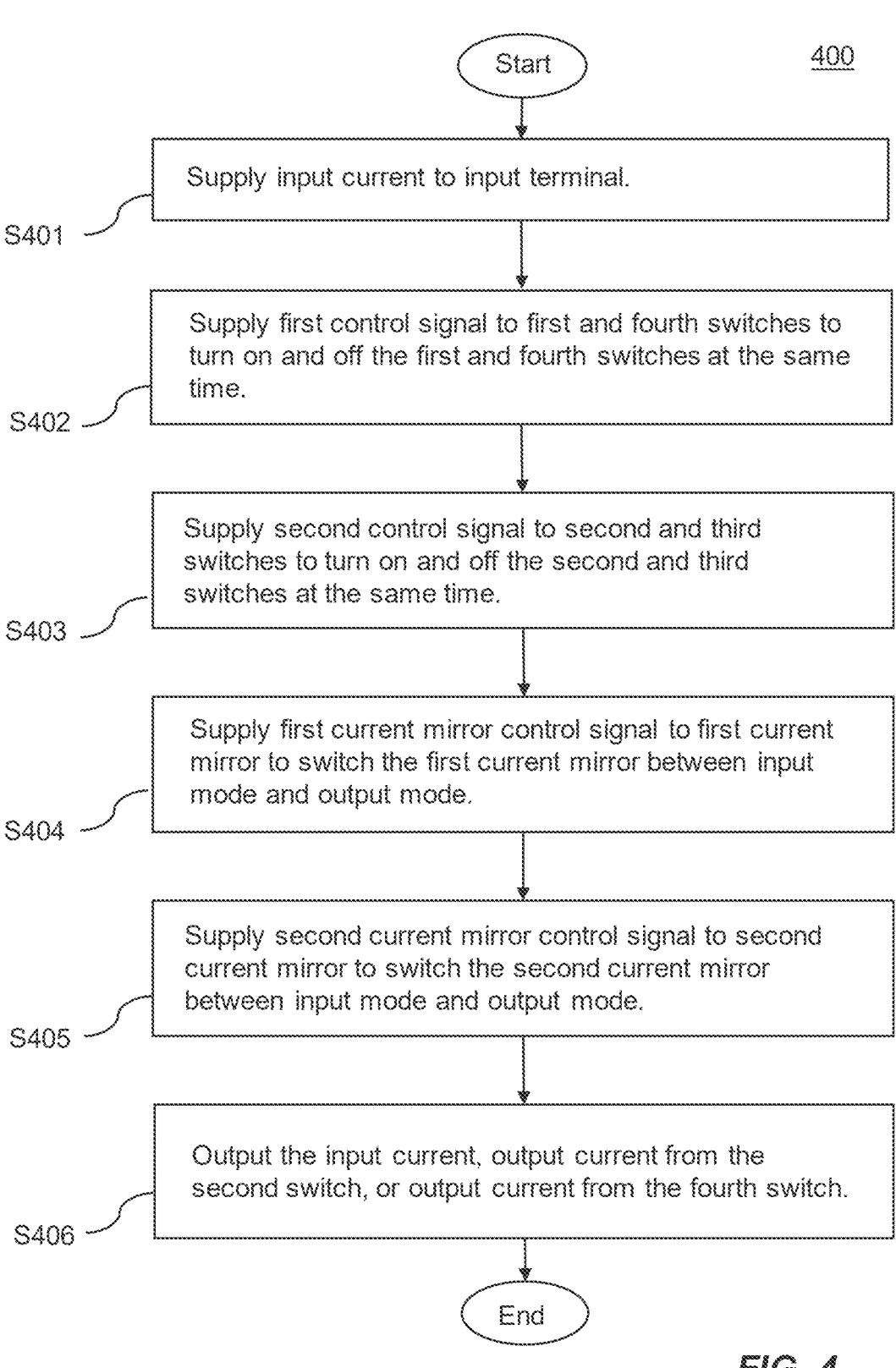

Start

400

S401

Supply input current to input terminal.

S402

Supply first control signal to first and fourth switches to turn on and off the first and fourth switches at the same time.

S403

Supply second control signal to second and third switches to turn on and off the second and third switches at the same time.

S404

Supply first current mirror control signal to first current mirror to switch the first current mirror between input mode and output mode.

S405

Supply second current mirror control signal to second current mirror to switch the second current mirror between input mode and output mode.

S406

Output the input current, output current from the second switch, or output current from the fourth switch.

End

*FIG. 4*

DYNAMIC CURRENT RECTIFIER

This invention was made with government support under Government Contract No. HR0011-21-C-0132 awarded by Defense Advanced Research Projects Agency (DARPA)-Microsystems Technology Office (MTO). The government has certain rights in the invention.

BACKGROUND

A rectifier is an electrical device that converts alternating current (AC), which periodically changes direction, into direct current (DC) which flows in a single direction. A typical example of the conventional rectifier is a p-n junction diode that allows electric current to flow in forward bias and blocks the current in reverse bias. The diode allows electric current to flow in one direction only, and this property of the diode allows it to act as a rectifier. In practical applications, multiple diodes or transistors may be arranged to form a rectification circuit to improve the performance of rectifiers.

SUMMARY

The disclosed invention provides a dynamic current rectifier that is an analog current rectifier using dynamic current mirrors. The dynamic current rectifier is capable of converting an oscillating bi-directional current into an absolute value. In order to address the problems of mismatches between transistors, the dynamic current rectifier of the disclosed invention is constructed to use a dynamic current mirror that uses only a single transistor, improving performance of rectification.

These advantages and others are achieved, for example, by a dynamic current rectifier that includes an input terminal configured to receive an input current, an output terminal configured to output a rectified output current, a first current mirror configured to generate a mirrored current, a second current mirror configured to generate a mirrored current, a first switch including a first terminal coupled to the input terminal and a second terminal coupled to the first current mirror, a second switch including a first terminal coupled to the output terminal and a second terminal coupled to the first current mirror, a third switch including a first terminal coupled to the input terminal and a second terminal coupled to the second current mirror, and a fourth switch including a first terminal coupled to the output terminal and a second terminal coupled to the second current mirror.

The dynamic current rectifier may further include a fifth switch including a first terminal coupled to the output terminal and a second terminal coupled to the input terminal, and a sixth switch including a first terminal coupled to the output terminal and a second terminal coupled to the first terminal of the fourth switch.

The dynamic current rectifier may further include a controller configured to provide a first control signal to the first and fourth switches to turn on and off the first and fourth switches, and to provide a second control signal to the second and third switches to turn on and off the second and third switches. The controller may be further configured to provide a first current mirror control signal to the first current mirror to switch the first current mirror between an input mode and an output mode, and to provide a second current mirror signal to the second current mirror to switch the second current mirror between an input mode and an output mode. The controller May be further configured to control the first through fourth switches and the first and second current mirrors such that: the first switch is turned on and the second switch is turned off while the first current mirror is in the input mode, the first switch is turned off and the second switch is turned on while the first current mirror is in the output mode, the third switch is turned on and the fourth switch is turned off while the second current mirror is in the input mode, and the third switch is turned off and the fourth switch is turned on while the second current mirror is in the output mode.

These advantages and others are achieved, for example, by a method including the steps of supplying an input current to an input terminal of a dynamic current rectifier, supplying a first control signal to a first and fourth switches of the dynamic current rectifier to turn on and off the first and fourth switches at the same time, supplying a second control signal to a second and third switches of the dynamic current rectifier to turn on and off the second and third switches at the same time, supplying a first current mirror control signal to a first current mirror of the dynamic current rectifier to switch the first current mirror between an input mode and an output mode, supplying a second current mirror control signal to a second current mirror of the dynamic current rectifier to switch the second current mirror between an input mode and an output mode, and outputting at an output terminal of the dynamic current rectifier the input current, an output current from the second switch, or an output current from the fourth switch. The first and second switches are coupled to the first current mirror, and the first switch is turned on and the second switch is turned off while the first current mirror is in the input mode. The third and fourth switches are coupled to the second current mirror, and the third switch is turned on and the fourth switch is turned off while the second current mirror is in the input mode.

BRIEF DESCRIPTION OF THE DRAWINGS

The preferred embodiments described herein and illustrated by the drawings hereinafter are to illustrate and not to limit the invention, where like designations denote like elements.

FIG. 4 is a flowchart diagram that shows a method for rectifying an alternating electrical current by using the dynamic current rectifier shown in FIG. 1.

DETAILED DESCRIPTION

Figure 1:
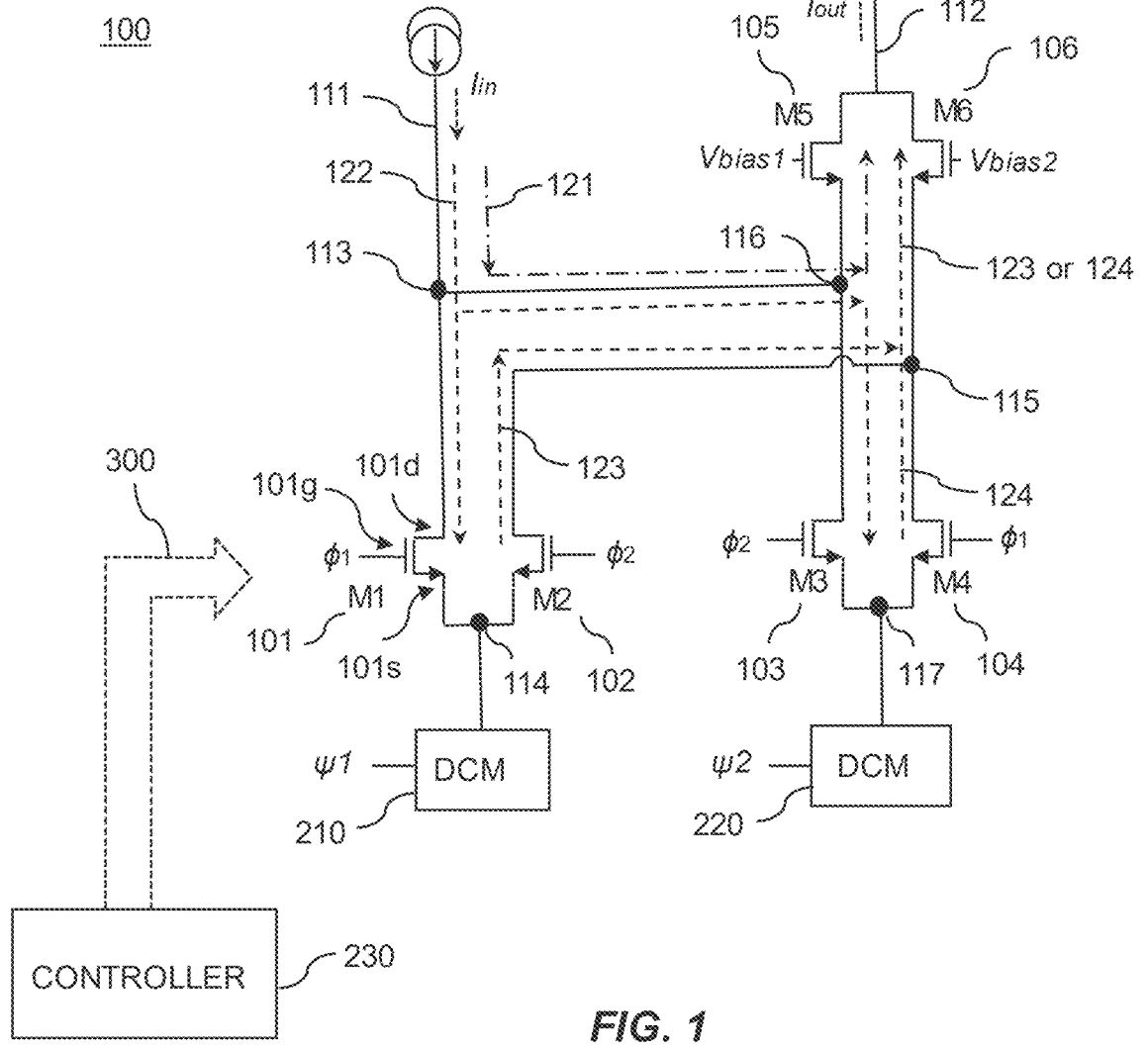
FIG. 1 is a circuit diagram of dynamic current rectifier of the disclosed invention.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

With reference to FIG. 1, shown is a circuit diagram of the dynamic current rectifier of the disclosed invention. In an embodiment, the dynamic current rectifier 100 includes a set of four (4) switches M1-M4 101, 102, 103, 104 and a set of two (2) dynamic current mirrors (DCMs) 210, 220. The dynamic circuit rectifier 100 further includes two switches M5-M6 105, 106 to control output from the switches 101, 102, 103, 104. The switches 101, 102, 103, 104, 105, 106 may be implemented as a single n-channel metal-oxide semiconductor (NMOS) transistor or p-channel metal-oxide semiconductor (PMOS) transistor, or as a full transmission gate switch (PMOS & NMOS). The switches 101, 102, 103, 104, 105, 106 may also optionally include charge injection compensation capacitors and/or transistors. The dynamic current rectifier 100 may include a controller 230 that provides signals 300 to control the switches and elements of the dynamic current rectifier 100, thereby controlling the current copying and outputting. FIG. 1 exemplarily shows NMOS transistors for the switches M1-M6 101, 102, 103, 104, 105, 106. However, the switches are not limited to the NMOS transistors. The switches M1-M6 101, 102, 103, 104, 105, 106 may be PMOS transistor, bipolar junction transistors or any other types of transistors. In an embodiment, all switches M1-M6 101, 102, 103, 104, 105, 106 in the dynamic current rectifier 100 may be the same type of transistor.

The controller 230 may be a typical controller that generates clock signals that are configured to operate transistors or the other types of switches. The controller 230 is configured to provide appropriate clock control signals 300 to the switches M1-M6 101, 102, 103, 104, 105, 106 and internal switches 202 (see FIG. 2) of the first and second DCMs 210, 220 for the operation of the dynamic current rectifier 100. The controller 230 may have functionality to adjust the clock control signals to the switches M1-M6 101, 102, 103, 104, 105, 106 and the first and second DCMs 210, 220 based on applications.

The basic building block of the dynamic current rectifier circuit 100 is a compact DCMs 210, 220. The dynamic current mirror (DCM) operates like a time-multiplexed current mirror that samples an input current on the gate of a switch and outputs a current that is controlled by the same gate voltage, and is therefore equal to the input current. Conventional simple current mirror circuit has two transistors: one transistor for input and the other transistor for output. One of the problems affecting the accuracy of a current mirror is the matching issue between the input and output transistors. For example, if the output transistor is larger than the input transistor, then the output current will also be larger than the input current. For fabricated integrated circuits, there will be an unavoidable variation in characteristics from one transistor to another, so perfect matching of the input and output currents may not be possible.

The dynamic current rectifier 100 of the disclosed invention uses particularly designed current mirror such as DCMs, which has a single transistor for both input and output roles, to remove the issue of mismatch between the input and output transistors in the conventional current mirror. However, the dynamic current rectifier 100 of the disclosed invention is not limited to use the DCMs, but may use conventional current mirrors. When conventional current mirrors are used for the dynamic current rectifier 100, the circuit of the dynamic current rectifier 100, for example, the circuit around the nodes 114 and 117, may be modified to fit with the conventional current mirrors. In the specification, the dynamic current rectifier 100 is described based on the circuits of DCMs.

Referring to FIG. 1, the dynamic current rectifier 100 is a device that receives alternating electrical current and outputs a direct electrical current. The dynamic current rectifier 100 includes input terminal 111 to receive input alternating current (AC) Iin. The dynamic current rectifier 100 is configured to convert the input AC Iin into direct current (DC) Iout, and to output the converted (or rectified) DC Iout at the output terminal 112. The dynamic current rectifier 100 includes a set of switches M1-M2 101, 102 that are electrically coupled to first DCM 210 and another set of switches M3-M4 103, 104 that are electrically coupled to second DCM 220.

Drain terminal 101$d$ of the first switch M1 101 is connected to the input terminal 111 through first node 113. Control signal 301 (see FIG. 3) with a phase $\phi_1$ is applied from the controller 230 to gate terminal 101$g$ of the first switch M1 101 to control the switch M1 101. Source terminal 101$s$ of the first switch M1 101 is connected to input/output node 114 of the first DCM 210. For illustration purpose, FIG. 1 provides reference numerals 101$g$, 101$s$ and 101$d$ for the gate, source and drain terminals of the first switch M1 101, respectively. The reference numerals of gate, source and drain terminals of the other switches M2-M6 102-106 are not provided, but would be apparently understood by the symbol of the NMOS transistor shown in FIG. 1.

The source terminal of the second switch M2 102 is connected to the input/output node 114 of the first DCM 210. Control signal 302 with a phase $\phi_2$ is applied from the controller 230 to the gate terminal of the second switch M2 102 to control the switch M2 102. The drain of the second switch M2 102 is connected to second node 115 that is connected to the source terminal of sixth switch M6 106 and the drain terminal of the fourth switches M4 104. The first node 113 is also connected to third node 116 that is connected to the drain terminal of the third switches M3 103 and the source terminal of the fifth switch M5 105. The source terminals of the third switch M3 103 and fourth switch M4 104 are connected to input/output node 117 of the second DCM 220. Control signal 302 with a phase $\phi_2$ is applied from the controller 230 to the gate terminal of the third switch M3 103 to control the switch M3 103. Control signal 301 with a phase $\phi_1$ is applied from the controller 230 to the gate terminal of the fourth switch M4 104 to control the switch M4 104. The drain terminals of the fifth switch M5 105 and the sixth switch M6 106 are connected to the output terminal 112 to output an output current Iout. The controller 230 may also provide proper control signals Vbias1, Vbias2 to the gate terminals of the fifth switch M5 105 and the sixth switch M6 106 to control the switches M5 and M6 105, 106.

Figure 2:
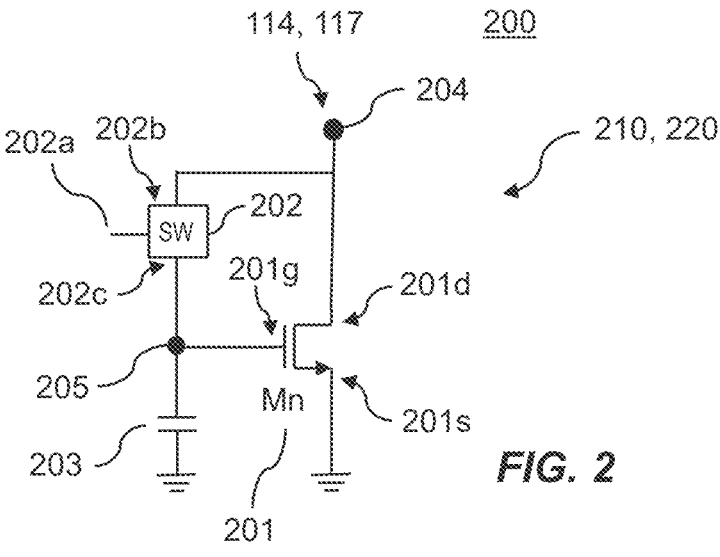
FIG. 2 is a circuit diagram of an exemplary dynamic current mirror (DCM) of the dynamic current rectifier of the disclosed invention.

With reference to FIG. 2, shown is an exemplary circuit diagram of dynamic current mirror (DCM) of the dynamic current rectifier of the disclosed invention. As described above, conventional current mirrors include two transistors, one for input function and the other for output function. The DCM 200, however, includes a single transistor Mn 201 for both input and output functions. The DCM 200 is configured to be switched, by a control signal, between an input mode and an output mode. In the input mode, the DCM 200 receives an input current, and in the output mode, the DCM 200 outputs mirrored current. FIG. 2 illustrates an exemplary circuit of the DCM 200, but the circuit of the DCM may be modified based on applications while keeping a single transistor for input and output roles.

Referring to FIG. 2, DCM 200 includes a switch Mn 201 that may be a transistor such as NMOS, PMOS, bipolar junction transistors or any other types of transistors. FIG. 2 exemplarily shows a NMOS transistor Mn 201. Drain terminal 201_d_ of the transistor Mn 201 is connected to input/output node 204 through which input current is input in the input mode and mirrored output current is output in the output mode. First terminal 202_b_ of the internal switch 202 is connected to the input/output node 204, and second terminal 202_c_ of the internal switch 202 is connected to a node 205 that is connected to the gate terminal 201_g_ of the transistor Mn 201. Consequently, the gate terminal 201_g_ of the transistor Mn 201 is coupled to the input/output node 204 through internal switch 202. Capacitor 203 is connected to the node 205 that is connected to the internal switch 202 and the gate terminal 201_g_ of the transistor Mn 201. The source terminal 201_s_ of the transistor 201 and second terminal of the capacitor 203 may be connected to a common ground. In an embodiment, the transistor Mn 201 may be the same type of transistor or switch as the switches M1-M4 101, 102, 103, 104.

In the first phase of operation, the internal switch 202 is turned on and the input/output node 204 is connected to an external input circuit (e.g. by turning on the first switch M1 101 and turning off the second switch M2 102 shown in FIG. 1). An input current is applied from the external input circuit through the input/output node 204. In this case, the gate terminal 201_g_ of the transistor 201, being connected to the drain terminal 201_d_ of the transistor 201 through the internal switch 202, is driven to appropriate voltage. The capacitor 203 retains the voltage (or charges) of the gate terminal 201_g_. During the first phase of the operation with the internal switch 202 turned on, the DCM 200 is in an input mode.

In the second phase of operation, the internal switch 202 is turned off, and the input/output node 204 is connected to an external output circuit (e.g. by turning on the second switch M2 102 and turning off the first switch M1 101 shown in FIG. 1). In this situation, the gate terminal 201_g_ is disconnected from the input/output node 204. Because the capacitor 203 retains the voltage (or charges) of the gate terminal 201_g_, the transistor 201 continues to produce the same current at the drain terminal 201_d_, as was input to the transistor 201 during the first phase of operation, through the external output circuit, mirroring the input current. In this way, the transistor 201 of DCM 200 performs both functions of an input transistor and output transistor of a conventional current mirror. During the second phase of the operation with the internal switch 202 turned off, the DCM 200 is in an output mode.

In order to turn on and off the internal switch 202, a clock control signal 303 or 304 (see FIG. 3) is applied to third terminal 202_a_ of the internal switch 202. In the disclosed invention, the control signal 303 or 304 to the internal switch 202 may be matched with control signal 301 or 302 to the external input circuit (i.e. switch M1 101 or switch M3 103), so that the phase of turning on and off the internal switch 202 is matched with the phase of switching of the external input circuit and the external output circuit.

The DCM 200 shown in FIG. 2 corresponds to the DCMs 210 and 220 shown in FIG. 1. The input/output node 204 corresponds to the input/output nodes 114 and 117 shown in FIG. 1. In the embodiment, the dynamic current rectifier 100 includes two DCMs 210, 220 to ensure a continuous output current. These DCMs 210, 220 operate with a complementary control clock signal 303 with phase $\psi_1$ and clock signal 304 with phase $\psi_2$, respectively (see FIG. 3). Each DCM operates to sense an input current when its associated switch is closed (turned on) and produce an output current when its associated switch is open (turned off). In the embodiment, the DCMs 210, 220 of the dynamic current rectifier 100 may be identical to avoid the issue of mismatch and to improve accuracy and performance. Herein, the identical DCMs means that the DCMs have substantially identical structural parameters and every physical characteristic of them is identical within acceptable variation in characteristics from one another.

Figure 3:
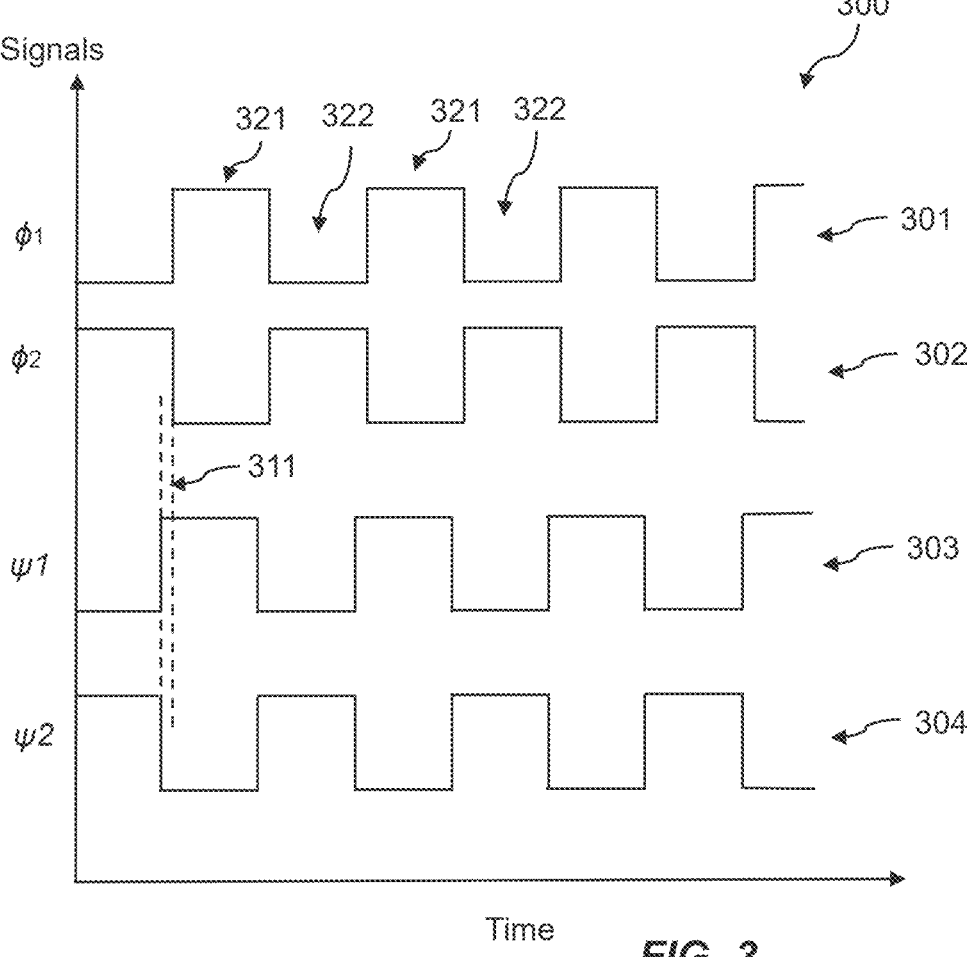
FIG. 3 shows clock control signals that are applied to the switches M1-M4 and DCMs shown in FIG. 1.

With reference to FIG. 3, shown are clock control signals that are applied to the switches M1-M4 and DCMs shown in FIG. 1. In the embodiment, first control signal 301 with phase $\phi_1$ is applied to the gate terminals of the first and fourth switches M1 M4 101, 104, and second clock control signal 302 with phase $\phi_2$ is applied to the gate terminals of the second and third switches M2 M3 102, 103. The phase $\phi_2$ of the control signal 302 is complement of the phase $\phi_1$ of the control signal 301. In other words, the phase $\phi_1$ and phase $\phi_2$ may have a phase difference of 180°. With these control signals 310, 302 having complementary phases, when the first and fourth switches M1 M4 101, 104 are turned on, the second and third switches M2 M3 102, 103 are turned off, and vice versa.

First current mirror control signal 303 with phase $\psi_1$ is applied to the terminal 202_a_ of the switch 202 of the first DCM 210 to switch the DCM 210 into input mode or output mode. Second current mirror control signal 304 with phase $\psi_2$ is applied to terminal 202_a_ of the switch 202 of the second DCM 220 to switch change the DCM 220 into input mode or output mode. The phase $\psi2$ of the control signal 304 is complement of the phase $\psi_1$ of the control signal 303.

There may be a phase difference 311 between the first current mirror control signal 303 and the first control signal 301 and the same phase difference 311 between the second current mirror control signal 304 and the second control signal 302. This phase difference 311 relative to the control signals 301, 302 is to improve performance of the dynamic current rectifier 100. The phase difference 311 may be adjusted or optimized to improve performance. Depending on applications, the phase difference 311 may be zero (0). Alternatively, the control signals 301 and 302, instead of the control signals 303 and 304, may be used to control the first DCM 210 and the second DCM 220, respectively.

Referring to FIGS. 1-3, operation of the dynamic current rectifier 100 is described below. For description purpose, the operation is exemplarily explained in the case that switches M1-M6 101, 102, 103, 104, 105, 106 are NMOS transistors as shown in FIG. 1.

In the case that the alternating input current Iin has a negative polarity, the negative input current 121 discharges the first node 113, which increases the gate-source voltage Vgs of the fifth switch M5 105 until the Vgs of the fifth switch M5 105 becomes greater than a threshold voltage Vth of the fifth switch M5 105. When the Vgs is greater than Vth (Vgs>Vth), the fifth switch M5 105 turns on. Then, the negative input current 121 is applied through the fifth switch M5 105 to the output terminal 112, so that the output current Iout of the dynamic current rectifier 100 is equal to the input current Iin (Iout=Iin).

In the case that the alternating input current Iin has a positive polarity, the positive input current 122 charges the first node 113 and the third node 116, which decreases the gate-source voltage Vgs of the fifth switch M5 105 until the Vgs of the fifth switch M5 105 becomes smaller than the threshold voltage Vth of the fifth switch M5 105. When the Vgs is smaller than Vth (Vgs<Vth), the fifth switch M5 105 turns off. The positive input current 122 continues to charge the first node 113 and the third node 116 until the input current 122 is accepted by one of the DCMs 210 and 220 through the first switch M1 101 or the third switch M3 103.

In the first phase of operation, while the positive input current 122 charges the first node 113 and the third node 116, the first switch M1 101 is turned on (at the first phase 321 of clock in the control signal 301), and the second switch M2 102 and the third switch M3 103 are turned off (at the first phase 321 of clock in the control signal 302). In this case, the positive input current 122 flows through the first switch M1 101. As shown in FIG. 3, the control signal 303 for the first DCM 210 is almost in-phase (with small phase difference 311) or in-phase with the control signal 301. Consequently, the internal switch 202 of the first DCM 210 turns on while the first switch M1 101 is being turned on, and the first DCM 210 accept the positive input current 122. Because the third switch M3 103 is turned off, the positive input current 122 cannot be applied to the second DCM 220.

In the second phase of operation, while the positive input current 122 charges the first node 113 and the third node 116, the first switch M1 101 and the fourth switch M4 104 are turned off (at the second phase 322 of clock in the control signal 301), and the second switch M2 102 and the third switch M3 103 are turned on (at the second phase 322 of clock in the control signal 302). The first DCM 210, which retains in the capacitor 203 the voltage received during the first phase of clock, outputs the learned or mirrored current 123 through the second switch M2 102. The mirrored current 123 is applied at the output terminal 112 through the second node 115 and the sixth switch M6 106. In this case, the mirrored output current 123 is the negative of the input current 122 (Iout=−Iin).

In this way, the dynamic current rectifier 100 outputs an output current Iout=Iin when the input current has a negative polarity, and outputs an output current Iout=−Iin when the input current has a positive polarity. In the other words, the dynamic current rectifier 100 outputs an output current Iout that is an absolute value of the input current Iin (Iout=|Iin|), performing the function of rectifiers.

In this second phase of operation, because the first switch M1 101 is turned off and the third switch M3 103 is turned on, the positive input current 122 charging the first node 113 and the third node 116 is applied to the second DCM 220 through the third switch M3 103. The internal switch 202 of the second DCM 220 turns on while the third switch M3 103 is being turned on, and the second DCM 220 accept the positive input current 122 and retains voltage in the capacitor 203 of the second DCM 220.

In the next phase of operation that is the same as the first phase of operation, the first switch M1 101 and the fourth switch M4 104 are turned on (at the first phase 321 of clock in the control signal 301) and the second switch M2 102 and the third switch M3 103 are turned off (at the first phase 321 of clock in the control signal 302). The second DCM 220, which retains in the capacitor 203 the voltage received during the second phase of clock, outputs the learned or mirrored current 124 through the fourth switch M4 104. The mirrored current 124 is applied at the output terminal 112 through the node 115 and the sixth switch M6 106.

For operation of the first and second DCMs 210, 220, better performance is usually achieved by turning off (disconnecting) the internal switch 202 of first DCM 210 before switching the output from the first switch M1 to the second switch M2 and by turning off (disconnecting) the internal switch 202 of second DCM 220 before switching the output from the third switch M3 to the fourth switch M4. For these reasons, the DCM control signals 303, 304 may have a phase difference 311 relative to the control signals 301, 202. The phase difference 311 may be small and may be adjusted to improve the performance of the dynamic current rectifier 100.

In operation, the input current Iin ranges from 0 to I_FS, where I_FS is the maximum available current. For example, in one application, a 4-bit precision DCM may be used where the least significant bit (LSB) is equal to 30 pA and therefore I_FS is 480 pA.

With reference to FIG. 4, shown is a flowchart diagram that shows a method 400 for rectifying an alternating electrical current by using the dynamic current rectifier 100 shown in FIG. 1. Referring FIG. 4, an input current is supplied to an input terminal 111 of a dynamic current rectifier 100, block S401. A first control signal 301 is supplied to a first and fourth switches 101, 104 of the dynamic current rectifier 100 to turn on and off the first and fourth switches 101, 104 at the same time, block S402. A second control signal 302 is supplied to a second and third switches 102, 103 of the dynamic current rectifier 100 to turn on and off the second and third switches 102, 103 at the same time, block S403. A first current mirror control signal 303 is supplied to a first current mirror 210 of the dynamic current rectifier 100 to switch the first current mirror 210 between an input mode and an output mode, block S404. The first and second switches 101, 102 are coupled to the first current mirror 210. The first switch 101 is turned on and the second switch 102 is turned off while the first current mirror 210 is in the input mode, and the first switch 101 is turned off and the second switch 102 is turned on while the first current mirror 210 is in the output mode. A second current mirror control signal 304 is supplied to a second current mirror 220 of the dynamic current rectifier 100 to switch the second current mirror 220 between an input mode and an output mode, block S405. The third and fourth switches 103, 104 are coupled to the second current mirror 220. The third switch 103 is turned on and the fourth switch 104 is turned off while the second current mirror 220 is in the input mode, and the third switch 103 is turned off and the fourth switch 104 is turned on while the second current mirror is in the output mode. An output current is output at an output terminal 112 of the dynamic current rectifier 100, block S406. The output current is one of the input current, an output current from the second switch, and an output current from the fourth switch.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:
1. A dynamic current rectifier, comprising:
an input terminal configured to receive an input current;
an output terminal configured to output a rectified output current;
a first current mirror configured to generate a mirrored current;
a second current mirror configured to generate a mirrored current;
a first switch comprising a first terminal coupled to the input terminal and a second terminal coupled to the first current mirror;
a second switch comprising a first terminal coupled to the output terminal and a second terminal coupled to the first current mirror;

a third switch comprising a first terminal coupled to the input terminal and a second terminal coupled to the second current mirror;

a fourth switch comprising a first terminal coupled to the output terminal and a second terminal coupled to the second current mirror;

a fifth switch comprising a first terminal coupled to the output terminal, a second terminal coupled to the input terminal, and a gate terminal;

a sixth switch comprising a first terminal coupled to the output terminal, a second terminal coupled to the first terminals of the second and fourth switches, and a gate terminal; and a controller configured to provide control signals to the first through sixth switches, wherein:

the controller provides the gate terminal of the fifth switch with a first output control signal, and the fifth switch is configured to be turned on at a polarity of the input current and to be turned off at an opposite polarity of the input current, and the controller provides the gate terminal of the sixth switch with a second output control signal.

2. The dynamic current rectifier of claim 1 wherein each of the first and second current mirror is a dynamic current mirror (DCM) comprising:

an input/output node;

a transistor comprising a drain terminal connected to the input/output node;

an internal switch comprising a first terminal connected to the input/output node, a second terminal connected to a gate terminal of the transistor, and a third terminal through which a current mirror control signal is provided to turn on and off the internal switch; and at least one capacitor comprising a first terminal connected to the second terminal of the internal switch and the gate terminal of the transistor.

3. The dynamic current rectifier of claim 1 further comprising the controller configured to provide a first control signal to the first and fourth switches to turn on and off the first and fourth switches, and to provide a second control signal to the second and third switches to turn on and off the second and third switches.

4. The dynamic current rectifier of claim 3 wherein a phase of the first control signal is complement of a phase of the second control signal.

5. The dynamic current rectifier of claim 3 wherein the controller is further configured to provide a first current mirror control signal to the first current mirror to switch the first current mirror between an input mode and an output mode, and to provide a second current mirror signal to the second current mirror to switch the second current mirror between an input mode and an output mode.

6. The dynamic current rectifier of claim 5 wherein a phase of the first current mirror control signal is complement of a phase of the second current mirror control signal.

7. The dynamic current rectifier of claim 5 wherein the controller is configured to control the first through fourth switches and the first and second current mirrors such that:

the first switch is turned on and the second switch is turned off while the first current mirror is in the input mode;

the first switch is turned off and the second switch is turned on while the first current mirror is in the output mode;

the third switch is turned on and the fourth switch is turned off while the second current mirror is in the input mode; and the third switch is turned off and the fourth switch is turned on while the second current mirror is in the output mode.

8. The dynamic current rectifier of claim 5 wherein the first current mirror control signal is the first control signal and the second current mirror control signal is the second control signal.

9. The dynamic current rectifier of claim 1 wherein the first through fourth switches are n-channel metal-oxide semiconductor (NMOS) transistors or p-channel metal-oxide semiconductor (PMOS) transistors.

10. The dynamic current rectifier of claim 1 wherein every physical characteristic of the first current mirror and the second current mirror is substantially identical.

11. A method for rectifying an alternating electrical current, comprising: supplying an input current to an input terminal of a dynamic current rectifier; supplying a first control signal to a first and fourth switches of the dynamic current rectifier to turn on and off the first and fourth switches at the same time; supplying a second control signal to a second and third switches of the dynamic current rectifier to turn on and off the second and third switches at the same time; supplying a first current mirror control signal to a first current mirror of the dynamic current rectifier to switch the first current mirror between an input mode and an output mode, wherein the first and second switches are coupled to the first current mirror, and wherein the first switch is turned on and the second switch is turned off while the first current mirror is in the input mode; supplying a second current mirror control signal to a second current mirror of the dynamic current rectifier to switch the second current mirror between an input mode and an output mode, wherein the third and fourth switches are coupled to the second current mirror, and wherein the third switch is turned on and the fourth switch is turned off while the second current mirror is in the input mode; supplying a first output control signal to a gate terminal of a fifth switch to turn on the fifth switch at a polarity of the input current and to turn off the fifth switch at an opposite polarity of the input current, wherein the fifth switch comprises a first terminal coupled to an output terminal and a second terminal coupled to the input terminal; supplying a second output control signal to a gate terminal of a sixth switch, wherein the sixth switch comprises a first terminal coupled to the output terminal and a second terminal coupled to a first terminals of the second and fourth switches; and outputting, at the output terminal of the dynamic current rectifier the input current, an output current from the second switch or an output current from the fourth switch.

12. The method of claim 11 wherein the first switch is turned off and the second switch is turned on while the first current mirror is in the output mode, and the third switch is turned off and the fourth switch is turned on while the second current mirror is in the output mode.

13. The method of claim 11 wherein: the first switch comprising a first terminal coupled to the input terminal and a second terminal coupled to the first current mirror; the second switch comprising the first terminal coupled to the output terminal and a second terminal coupled to the first current mirror; the third switch comprising a first terminal coupled to the input terminal and a second terminal coupled to the second current mirror; and the fourth switch comprising the first terminal coupled to the output terminal and a second terminal coupled to the second current mirror.

14. The method of claim 11 wherein each of the first and second current mirror is a dynamic current mirror (DCM) comprising:

an input/output node;

a transistor comprising a drain terminal connected to the input/output node;

an internal switch comprising a first terminal connected to the input/output node, a second terminal connected to a gate terminal of the transistor, and a third terminal through which a current mirror control signal is provided to turn on and off the internal switch; and at least one capacitor comprising a first terminal connected to the second terminal of the internal switch and the gate terminal of the transistor.

15. The method of claim 11 wherein a phase of the first control signal is complement of a phase of the second control signal.

16. The method of claim 11 wherein a phase of the first current mirror control signal is complement of a phase of the second current mirror control signal.

17. The method of claim 11 wherein first current mirror control signal is the first control signal and the second current mirror control signal is the second control signal.

18. The method of claim 11 wherein the first through fourth switches are n-channel metal-oxide semiconductor (NMOS) transistors or p-channel metal-oxide semiconductor (PMOS) transistors.

19. The method of claim 11 wherein every physical characteristic of the first current mirror and the second current mirror is substantially identical.

\* \* \* \* \*